April 3, 1928.  D. C. KLAUSMEYER  1,664,889
DETACHABLE GEAR UNIT
Filed Feb. 2, 1927  2 Sheets-Sheet 2
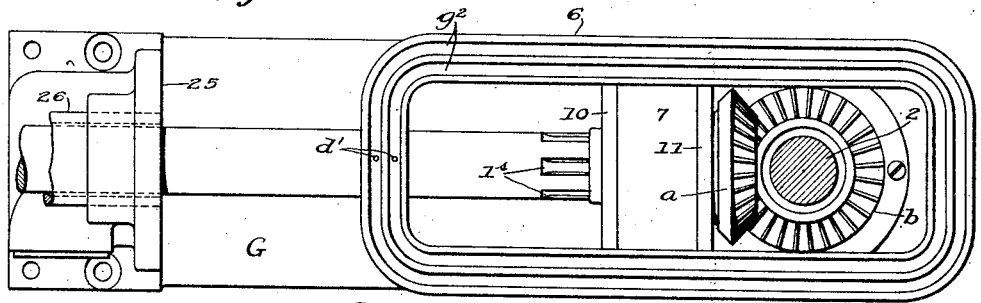
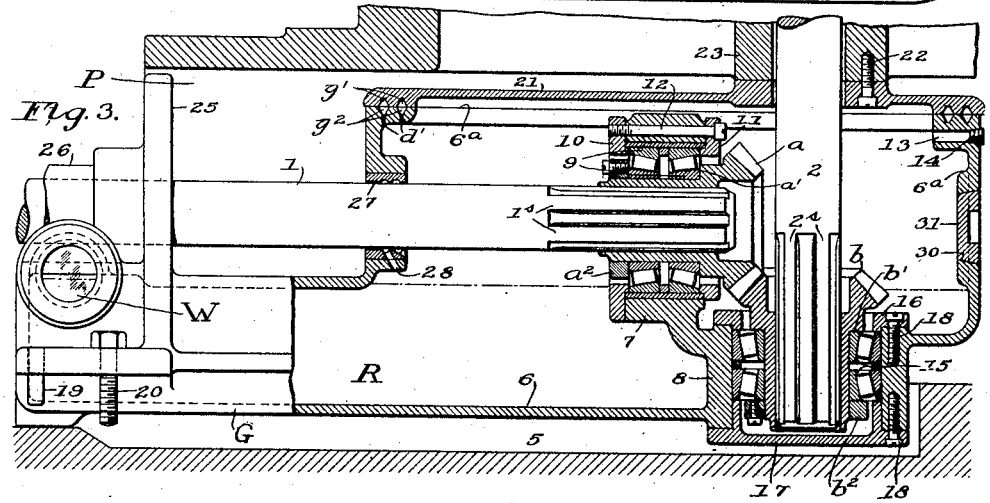
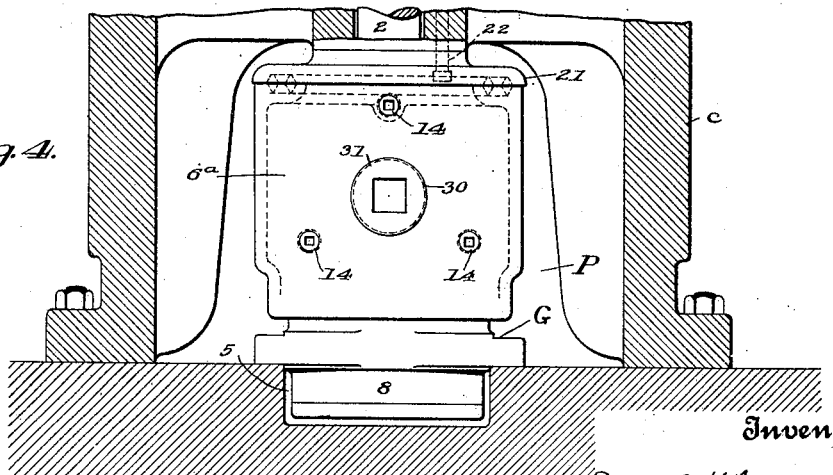
Inventor
David C. Klausmeyer
By Attorney
Albert F. Nathan Patented Apr. 3, 1928.

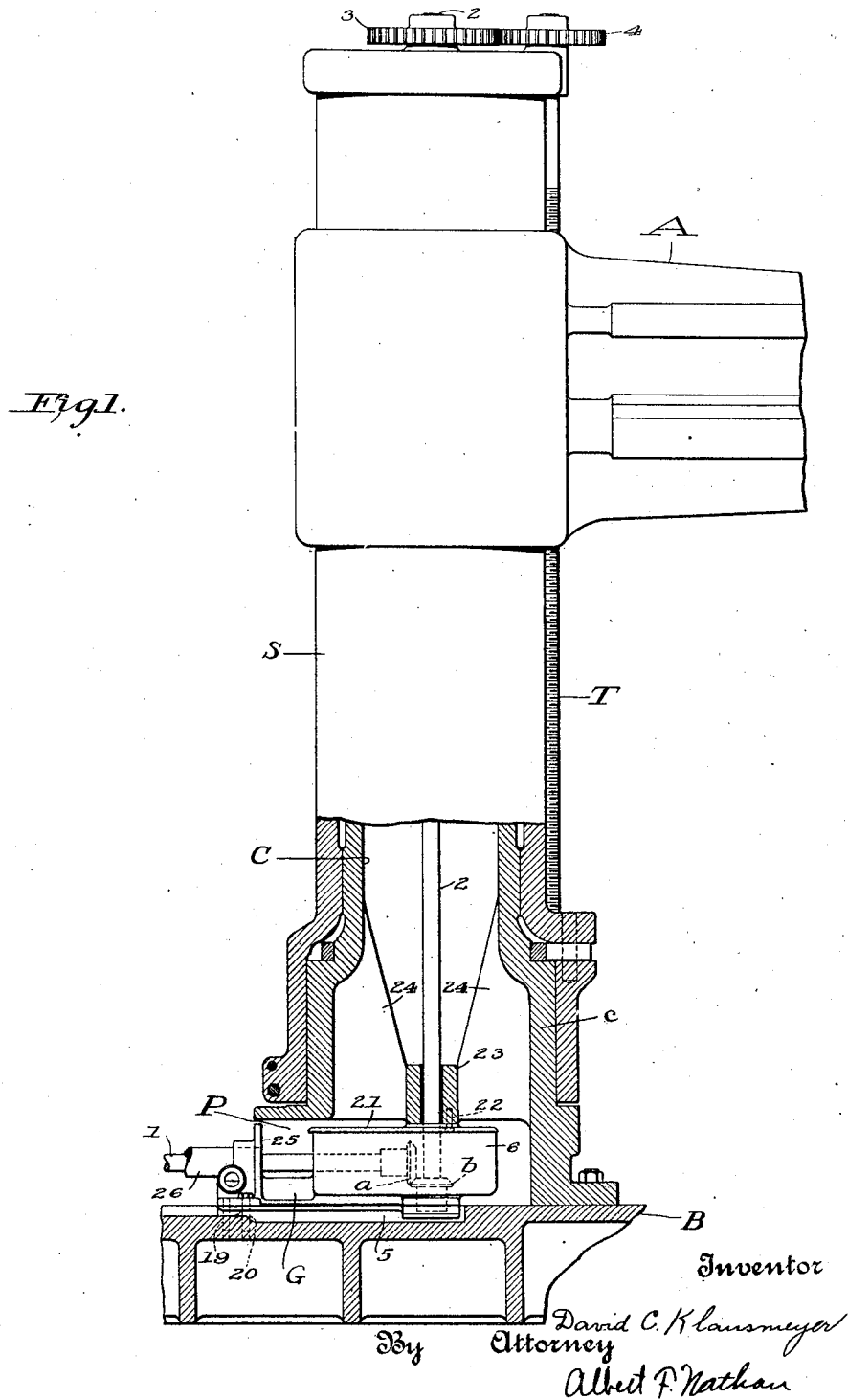

1,664,889

UNITED STATES PATENT OFFICE.

DAVID C. KLAUSMEYER, OF CINCINNATI, OHIO, ASSIGNOR TO THE CINCINNATI BICKFORD TOOL COMPANY, OF CINCINNATI, OHIO, A CORPORATION OF OHIO.

DETACHABLE GEAR UNIT.

Application filed February 2, 1927. Serial No. 165,316.

This invention proposes a readily insertable gear-unit so coordinated with the permanent formation of the frame of a radial drill as to form in situ a dirt-proof casing for an oil bath adapted continuously to lubricate the operative connection between driving and driven shafts common to radial drills. Radial drills as commonly constructed, include a frame comprising a horizontally disposed base and a hollow column secured to the base and extending upwardly therefrom, which column supports the usual radial arm. In one type of radial drill power to rotate the drill spindle and to translate the arm on the column is provided by a prime-mover secured upon the base adjacent the foot of the column. Power is conveyed from the prime-mover to the point of use by a suitable transmission including a horizontally disposed driving shaft, actuated by the prime-mover, and a vertically disposed driven shaft journaled within the column and extending to the upper end thereof. These two shafts are usually connected together by means of a pair of bevel gears.

For many years great difficulty was experienced in assembling these machine tools due to the fact that the connecting bevel gears occupy an inaccessible location. These gears also require occasional inspection and repair and this had been an extremely difficult and troublesome task; it being necessary first to unbolt and remove the column from the base. More or less recently these inherent difficulties were partially overcome by assembling the two bevel gears in driving relation in a gear-unit and providing means whereby this unit could be inserted into place after the column and base had been bolted together, the driving and driven shafts thereafter being inserted into the properly aligned gears and held against relative rotation therewith by suitable splines. This construction also permitted ready removal of the gear-unit, and the gears carried thereby, for the purpose of inspection and repair without removing the column from the base. These gear-units were so constructed as also to provide means for continuously lubricating the bevel gears and the bearings therefor. It was found however, that where the gear-units were open structures dirt, chips, etc. falling down through the column and also entering through the portal through which the gear-unit was inserted would find its way into the gears and bearings, thereby impairing them. It was also found undesirable to form the gear-unit as a closed self-contained structure inasmuch as the gears therein were then not readily available for inspection and repair when the unit was removed from the machine. In the latter form it was necessary, after having removed the gear unit, to disassemble the gear-unit before the gears, bearings, etc. therein could be inspected and repaired.

This invention has for an object to overcome the inherent defects of those prior devices and to provide an improved insertable gear-unit which, when in situ will be devoid of all of the disadvantages and undesirable features of the open type unit, and which when removed from the machine, will readily present to view the gears therein without the necessity of disassembling the gear-unit or of removing any part thereof.

This object has been attained by providing an improved gear-unit of open pan-like construction provided with the necessary bearings for journaling the bevel gears and also forming a reservoir for lubricant which provides a constant oil bath for the bevel gears and bearings. To exclude dirt, etc., from the interior of this normally open structure this invention proposes a frame so fashioned that, when the gear-unit is in its operative position, the frame provides a close fitting cover for the pan. Thus when the unit is in situ it has all of the advantages of a completely closed structure and when withdrawn from the machine for inspection readily presents to view all of the gears and bearings therein.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts through all the views, of which:—

Figure 1 is a side elevation, partly in section, of a portion of a radial drill embodying the present invention. Fig. 2 is an enlarged plan of the improved gear-unit. Fig. 3 is a longitudinal section through the gear-unit in its operative position in the machine column and showing the cooperation between the open gear-unit and a closure element therefor permanently provided by the column. Fig. 4 is a vertical section through the lower portion of the machine column and base and showing a right end elevation of the gear unit disclosed in the other figures.

Referring more particularly to the drawings the invention is disclosed, in its preferred form, as embodied in a radial drill constructed with a main frame comprising a base B, and an upright tubular column C secured upon the base and provided with an enlarged lower portion $c$. As is usual in this type of machine tool a sleeve S is rotatably journaled upon the column and supports a radial arm A which is translatably mounted on the sleeve and which supports a suitable tool head, not shown. Vertical movement of the arm on the sleeve is effected by rotation of a screw T having a threaded connection with a suitable nut (not shown) carried by the radial arm. Power to rotate this screw, and also to rotate the tool spindle journaled in the tool head, is preferably provided by a prime-mover mounted on the base B adjacent the foot of the column. Inasmuch as the prime-mover and the specific means for effecting rotation of the tool spindle are conventional and form no part of this invention illustration and description thereof is deemed unnecessary. It will suffice to say that the prime-mover is operatively connected with a shaft 1 extending substantially parallel with the base and, which for the purpose of this disclosure, will be considered a drive shaft. Power is transmitted from the shaft 1 through bevel gears $a$ and $b$ to an upright shaft 2 arranged within the column C and substantially coaxial therewith. At its upper end the shaft 2 carries a gear 3 which meshes with and drives a similar gear 4 on the arm-translating screw T. The tool spindle also may be rotated from the gear 3 through a suitable transmission, not shown.

As hereinbefore stated it is the primary object of this invention to provide an improved normally open supporting unit for the gears $a$ and $b$ upon which the gears may be assembled in their operative relation prior to insertion of the gear-unit into the frame, and so to coordinate the gear-unit with the machine frame that all dirt and other foreign matter will be excluded from the gears, bearings and lubricating material when the gear-unit is in situ. To that end, the improved gear-unit G is formed as a relatively long and narrow sub-frame adapted to be inserted into the main frame through a portal P formed in lower enlarged portion $c$ of the column. To enable the gear-unit to be placed as low as possible, thereby to preclude the necessity of weakening the column by the provision of a large portal, the base B also is preferably recessed, as at 5, and a portion of the gear unit projects thereinto. The sub-frame is constructed with an open pan-like portion 6 formed with bearing brackets 7 and 8 within which are rotatably journaled the gears $a$ and $b$, respectively. Anti-friction bearings 9 are interposed between the hub of the gear $a$ and the bearing bracket 7 to facilitate free rotation of the gear. These anti-friction bearings are held in place by thrust rings 10 and 11 located at opposite sides of the bracket 7 and held thereagainst by screws 12 (one only of which is shown) passed through the ring 11 and bracket 7 and threaded into the ring 10. To facilitate the drilling of holes through the bracket 7 for the passage of the screws 12, holes 13 may be drilled in the end wall $6^a$ of the pan-like portion 6 and these holes later may be closed by threaded plugs 14 as shown in Figs. 3 and 4. Likewise the wall $6^a$ is provided with an opening 30 through which machining operations may be performed on the bearing bracket 7. This opening is normally closed by a plug 31. The gear $b$ also is mounted in anti-friction bearings 15 interposed between the hub of the gear and the bearing bracket 8. These anti-friction bearings are held in place by thrust bearings 16 and 17 secured to the opposite ends of the bracket 8 by screws 18. The thrust bearing 17 is also formed to serve as a closure for the bore through the bearing bracket 8 thereby to preclude leakage of lubricant from the gear-unit. Gears $a$ and $b$ are held against axial movement in one direction by shoulders $a'$ and $b'$ respectively engaging one face of one of the thrust bearings and against axial movement in the opposite direction by collars $a^2$ and $b^2$ threaded upon the hubs of the gears and engaging the opposite face of the other thrust bearing. Continuous lubrication of the gears $a$ and $b$ and their bearings is effected by forming the lower portion of the sub-frame as a reservoir R and maintaining sufficient lubricant therein to provide a bath for the gears and bearings. To enable the operator to be advised as to the amount of lubricant in the reservoir, the forward end thereof projects without the portal P and is provided with a window W through which the level of the lubricant may be observed.

It is to be understood that the gears $a$ and $b$ are assembled in the gear-unit, as shown in Fig. 3, before the gear-unit is inserted through the portal and into the machine frame and that after the unit is secured in place on the base, as by dowel pins 19 and bolts 20, the shafts 1 and 2 are inserted into the gears $a$ and $b$. Splines $1^s$ and $2^s$ on the shafts 1 and 2, fit into grooves formed within the hubs of the gears $a$ and $b$, respectively, thereby establishing a driving connection between each shaft and its respective gear. It will be perceived that inasmuch as the gears $a$ and $b$, and the bearings therefor, are located within the open pan-like portion 6 of the gear unit those parts will be readily available for inspection and repair whenever the gear-unit is withdrawn from the column.

To prevent dirt and other foreign matter from entering the gear-unit when it is in its operative position in the machine frame, the frame is so constructed as to provide a closure for the pan-like portion 6. This closure may be provided either by the base section B or the column section C and may be formed either integral with one of those sections or as a separate element supported thereby. Preferably the closure will be formed as a plate 21 supported by the column section C and secured thereto by screws as 22 threaded into a hub 23 supported by inwardly projecting ribs 24 formed integral with column. The plate 21 is supported at such an elevation that it will just permit the pan-like portion of the gear-unit to be slid beneath it and where it will contact with the upper surface $6^a$ thereof when the gear-unit is secured in its operative position. The plate 21 is preferably of the same shape and size as the plan of the section 6 of the gear-unit and therefore forms a complete cover for the normally open section 6 when the gear-unit is in situ. To facilitate insertion of the shaft 2 into the gear $b$ and also to preclude any possibility of binding on the shaft the latter preferably passes freely through the hub 23 and the plate 21 supported thereby and has a lower bearing only in the gear-unit. To prevent seepage of oil between the gear-unit and its cover plate these two elements are preferably provided with complemental grooves $g^1$ and $g^2$ which collect the oil attempting to escape therebetween and drain it back into the reservoir through ducts $d'$.

The gear-unit is provided, adjacent its outer end, with an upright wall 25 which serves substantially to close the portal P when the gear-unit is in its operative position and also to provide a support for one end of a tube 26 which surrounds the shaft 1 and forms a guard therefor.

To prevent outward flow of oil along the shaft 1 the shaft passes through an oil-guard 27 which serves to remove oil from the shaft and return it to the reservoir through ducts 28.

From the foregoing it will be perceived that this invention provides an improved gear unit and a specially formed main frame which when in situ afford all of the advantages of a completely closed and self-contained gear-unit and which overcome all of the disadvantages of the previous open type gear-units. Conversely when the improved gear-unit is withdrawn from the machine frame it immediately presents to view the gears and bearings, thereby embodying all of the advantages of the open type gear-unit and none of the disadvantages of the closed and self-contained gear-unit.

Without further analysis, the foregoing will so fully reveal the gist of this invention that others can, by applying current knowledge, readily adapt it for various utilizations by retaining one or more of the features that, for the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of the United States:

1. A radial drill combining a frame comprising a base and an upright column; a transmission unit removably secured within said frame adjacent the juncture of the base and the column, said unit having an open pan-like portion and two mating angle-drive gears located within said portion; a driving shaft operatively connected with one of said gears; a driven shaft operatively connected with the other of said gears; and a closure provided by said frame and adapted to close said open portion when the transmission unit is in its operative position.

2. A radial drill combining a base; an upright column secured upon said base and provided with an opening at the juncture of the base and column; a device located normally in the lower portion of said column for transmitting motion at an angle, said device comprising a sub-frame bodily removable through said opening; two mating bevel gears rotatably journaled in bearings provided by said sub-frame; a pan-like reservoir, provided by said sub-frame, containing said bearings and gears and affording constant lubrication therefor; a drive shaft detachably connected with one of said gears; a driven shaft detachably connected with the other of said gears; and a cover for said reservoir provided by said column and cooperating with said reservoir to form in situ a dirt-proof casing.

3. A radial drill combining a base; an upright column provided with an opening; a gear-unit insertable through said opening into operative position in said column; means to secure said gear unit in its operative position; two mating bevel-gears journaled in bearings provided by said gear-unit; an open topped casing surrounding said gears and comprising an oil bath for said gears; and a cover plate for said casing permanently supported by said column cooperating with the casing to form in situ a dirt-proof housing for said gears.

4. A radial drill combining a main frame comprising a base and an upright column, one of which is provided with an opening; a sub-frame insertable through said opening into operative position at the juncture of said base and column; means to secure said sub-frame in its operative position; cooperating elements mounted on said frame to effect an angular drive; means located externally of said main frame and operatively connected with one of said elements to transmit motion thereto; a driven member actuated by another of said elements; an open container for said cooperating elements provided by said sub-frame; and a cover for said container permanently arranged within said column and adapted to close said container against the entrance of dirt when the sub-frame is in its operative position.

5. A radial drill combining a base; a column secured thereto and provided with a portal; a gear-unit insertable through said portal, means to secure said gear-unit in operative position; mating angular-drive gears assembled on said gear-unit before its insertion; means permitting a drive shaft to be connected with one of said gears and a driven shaft to be connected with the other of said gears after said gear-unit has been secured in its operative position; and a housing for said gears comprising disconnected complemental casing elements provided by said gear-unit and said column respectively, said casing elements together forming in situ a dirt-proof enclosure for said gears.

6. A radial drill combining a main frame comprising a base and a column secured thereto, one of which is provided with a portal; a gear-unit insertable through said portal into operative position at the juncture of said base and column; mating angular-drive gears mounted on said gear-unit; a drive shaft connected with one of said gears; a driven shaft connected with the other of said gears; and means provided by said gear-unit substantially to close said portal when the gear-unit is in its operative position.

7. A radial drill combining a base; a column provided with a portal; a gear-unit fitted with angular-drive gears insertable through said portal into operative position at the juncture of said base and column, said gear unit being provided with a pan-like portion containing said gears and affording a lubricant bath therefor; means to secure said gear-unit to said base with the upper edge of said pan-like portion at a predetermined level; and a cover-plate permanently secured to said column with its lower surface at the level of the upper surface of said pan-like portion and forming a closure therefor when the gear-unit is in its operative position.

8. A radial drill combining a base; a column provided with an opening; a gear-unit insertable through said opening into operative position at the juncture of said base and column, said gear unit comprising a sub-frame formed with an open reservoir, two mating bevel gears journaled in bearings supported in said reservoir and lubricated by lubricant held therein; driving and driven shafts connected with said bevel gears; a cover-plate for said open reservoir provided by said column and maintained in contact with the upper edge of said reservoir when the gear-unit is in its operative position; and means to prevent seepage of lubricant between the adjacent faces of said reservoir and cover, said means including a lubricant duct formed in the meeting faces of said reservoir and cover and a drain duct leading back to said reservoir.

In witness whereof, I have hereunto subscribed my name.

DAVID C. KLAUSMEYER.